United States Patent [19]

Nagata et al.

[11] Patent Number: 4,731,624

[45] Date of Patent: Mar. 15, 1988

[54] DATA IMPRINTING DEVICE FOR A CAMERA

[75] Inventors: Toru Nagata; Chikara Aoshima, both of Kanagawa; Hiroshi Maeno; Hideo Tamamura, both of Tokyo, all of Japan

[73] Assignee: Canon Kabushiki Kaisha, Japan

[21] Appl. No.: 915,915

[22] Filed: Oct. 3, 1986

Related U.S. Application Data

[63] Continuation of Ser. No. 704,670, Feb. 25, 1985, abandoned.

[30] Foreign Application Priority Data

| Feb. 25, 1984 | [JP] | Japan | 59-33344 |
| Feb. 25, 1984 | [JP] | Japan | 59-33345 |
| Feb. 25, 1984 | [JP] | Japan | 59-33347 |
| Feb. 25, 1984 | [JP] | Japan | 59-33348 |
| Feb. 25, 1984 | [JP] | Japan | 59-33349 |

[51] Int. Cl.$^4$ .............. G03B 17/08; G03B 17/24; G06C 7/02
[52] U.S. Cl. .............. 354/64; 354/105; 340/365 E; 235/145 R
[58] Field of Search .............. 354/64, 105–109, 354/289.1, 289.12; 340/365 A, 365 E, 850; 235/145 R; 367/131–134

[56] References Cited

U.S. PATENT DOCUMENTS 4,007,443 2/1977 Bromberg et al. .............. 340/365 E

FOREIGN PATENT DOCUMENTS

| 116127 | 9/1980 | Japan | 340/365 E |
| 24132 | 2/1983 | Japan | 354/109 |
| 193532 | 11/1983 | Japan | 354/109 |

Primary Examiner—W. B. Perkey
Attorney, Agent, or Firm—Toren, McGeady & Associates

[57] ABSTRACT

A data imprinting device provided with an input lock switch for disabling the input of imprinting data by data input switches, and a discriminating circuit for disabling the data input when the input lock switch is ON and only when all the data input switches are ON.

32 Claims, 5 Drawing Figures

DATA IMPRINTING DEVICE FOR A CAMERA

This is a continuation of application Ser. No. 704,670, filed Feb. 25, 1985, now abandoned.

BACKGROUND OF THE INVENTION

1. Field of the Invention:

This invention relates to a data imprinting device for a camera capable of underwater photography.

2. Description of the Prior Art:

A majority of recently developed cameras have data imprinting devices carried on the back covers thereof. The data from an electronic timer circuit are displayed by liquid crystal light shutter display elements, and, when the display is illuminated from the back, are imprinted on the photographic film. To correct or select these data, or to set the film sensitivity, there are actuators which are usually, in most cases, constructed in the form of push button switches. When in application of this kind of data imprinting device to cameras capable of underwater photography, measures must be taken to prevent erroneous inputs from occurring when the water pressure becomes so high as to erroneously press the push buttons. According to the prior art, a water depth meter is incorporated in the camera and renders the push button switches inoperative for setting, or adjusting the display when the water depth is deeper than a certain value, as disclosed in Japanese Laid-Open Patent Application No. SHO 58-173725. Once the input-locking is effected, all actuating operations are rejected. This can be known by the user only when he sees that the data readout in the display window is not responsive to the actuation of the buttons. Since under water at so deep a depth as to lock the input data, however, the available light is very low, it is difficult ascertain whether the input data are not locked. If the user is unaware of the fact that the input data have been locked, incorrect data will be imprinted in a continuous series of frames of the film.

SUMMARY OF THE INVENTION

An object of the present invention is to eliminate the above-described drawbacks and to lock the input only when all of the data input switch buttons are pushed down simultaneously, thereby it being made possible for the user to ascertain whether the data input is proper or improper depending upon his feeling of the mobility or immobility of the data input button respectively as he touches it.

Another object of the present invention is to provide a data imprinting device for a camera with means making it possible for the user to ascertain whether or not the data input is locked by the water pressures or other external pressure and preventing an erroneous input due to user's erroneous actuation or accidental contact with something solid.

Other objects of the invention will become apparent from the following description of embodiments thereof.

DETAILED DESCRIPTION OF THE PREFERRED EMBODIMENTS

Figure 1:
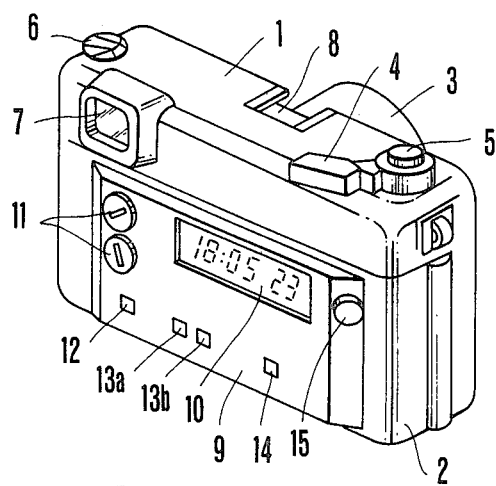
FIG. 1 is a perspective view of an embodiment of a data imprinting device according to the present invention applied to a camera capable of underwater photography.

The present invention will now be described in connection with an embodiment thereof by reference to the drawings. In FIG. 1, a camera body 1 has a back cover 2 in which a date data imprinting device is incorporated. 3 is a lens barrel. A winding lever 4, a release button 5 and a rewind crank 6 are positioned on the upper panel of the camera body 1. 7 is an eye-piece of the finder. 8 is a shoe for an underwater flash or the like. These operating members and the back cover 2 are watertightly assembled to the camera body 1, as is well known in the art. The watertightening techniques are also known. The date data imprinting device is housed in a casing 9 molded as a unit with the back cover 2. On the casing 9 there are shown a liquid crystal panel 10 for reading out the imprinting data, battery chamber covers 11 for the electrical power source of the imprinting device 9, a mode selector button 12 for watch functions, data setting or adjusting buttons 13a and 13b, a film speed setting button 14, and an input lock button 15. The pressure necessary to operate the button 15 is lower than that necessary to operate each of the buttons 12 to 14. For this purpose, the area of the button 15 is made larger than that of each of the buttons 12 to 14, or the bias force for the button 15 is made weaker than that for each of the buttons 12 to 14. Therefore, as the pressure applied to the camera (from either water or the air) increases, the input lock button 15 is first depressed, and, after a furthermore increase of the pressure, the buttons 12 to 14 are depressed at nearly the same time.

Figure 2:
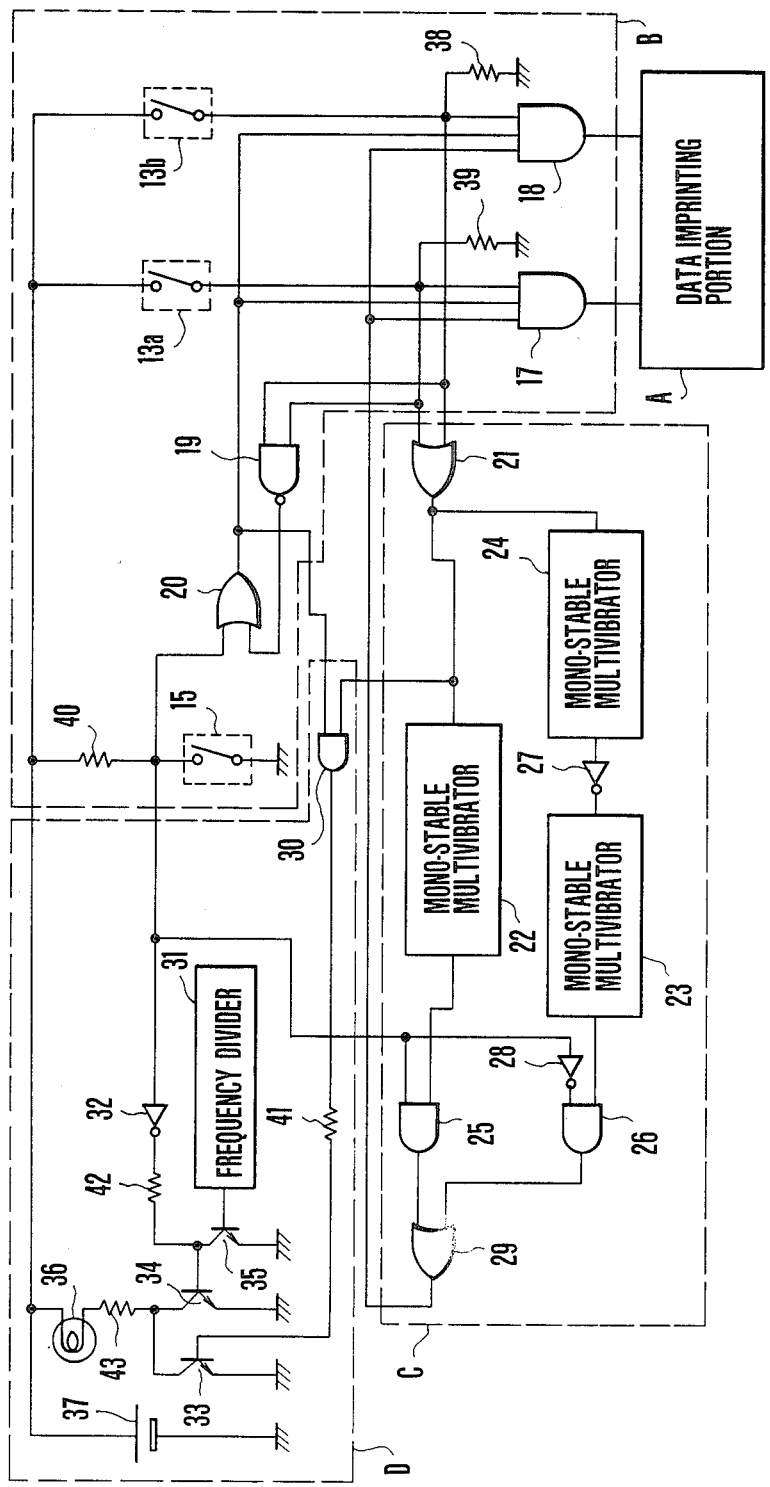
FIG. 2 is an electrical circuit diagram of the device of FIG. 1.

FIG. 2 illustrates the circuitry of the data imprinting device of FIG. 1 and includes a data imprinting portion A, housing an electronic watch circuit, an input control circuit B for the data imprinting portion A, a timing circuit C for determining the time for which the input to the data imprinting portion A is effective, and an illumination drive circuit D cooperating with the input control circuit B to illuminate the external display liquid crystal panel 10.

The input control circuit B comprises switches 13a and 13b for the buttons 13a and 13b of FIG. 1 (the switches for the buttons 12 and 14 being omitted for the purpose of simplicity), an input lock switch 15, AND gates 17 and 18, a NAND gate 19, an OR gate 20, and pull-up resistors 38, 39 and 40. The output of the NAND gate 19 is changed from normally "high" to "low" only when both of the switches 13a and 13b are turned on. The output of the OR gate 20 becomes "high" when at least one of the two conditions, that the input lock switch 15 is OFF or that the output of the NAND gate 19 is "high", is satisfied, that is in other words, when at least one of the conditions, that the input lock button 15 is not depressed and that at least one of the buttons 13a and 13b is not depressed, is satisfied. The AND gates 17 and 18 responsive to closure of the switches 13a and 13b, respectively, produce outputs of "high" level provided that the output of the OR gate 20 is "high" and the output of the timing circuit C is "high". These outputs are applied as data change-over signals to the data imprinting portion A.

The timing circuit C comprises mono-stable multivibrators 22, 23 and 24, OR gates 21 and 29, AND gates 25 and 26 and inverters 27 and 28. The OR gate 21 receptive of ON/OFF signals from the switches 13a and 13b changes its output from normally "low" to "high" level when at least one of the ON/OFF signals represents ON. Responsive to this change of the output of the OR gate 21, the monostable multivibrators 22 and 24 produce pulses of durations t1 and t2, respectively. The output of the multivibrator 24 is connected to the input of the inverter 27 of which the output is connected to the input of the mono-stable multivibrator 23. In synchronism with the rising edge of the pulse from the multivibrator 24, the multivibrator 23 starts to produce a pulse of duration t3. From the moment at which the OR gate 21 changes to "high" level, a "high" signal is applied to the AND gate 25 for the time t1, and after the time t2 therefrom, a "high" signal is applied to the AND gate 26 for the time t3. The remaining input terminal of the AND gate 25 is connected to the output of the input lock switch 15. The remaining input terminal of the AND gate 26 is connected through the inverter 28 to the output of the input lock switch 15. Therefore, when the input lock switch 15 is OFF, a "high" signal is given to the AND gate 25, and when ON, to the AND gate 26.

In short, the output of the delay circuit C takes either a "low" level when all the switches 15, 13a and 13b are open, or, "high" level either for the time t1 from the moment at which either or both of the switches 13a and 13b is or are closed, when the input lock switch 15 is OFF, or for the time t3 after the elapse of the time t2 from that moment; and when the input lock switch 15 is ON. Thus, the timing circuit C determines when and how long the outputs of the data setting switches 13a and 13b are placed onto the input lines of the data imprinting portion A.

The functions of the input control circuit B may be summarized in table 1 below:

TABLE 1

| Input Lock Switch 15 | OFF (Input Not Locked) | ON (Input Locked) | |
|---|---|---|---|
| Data Setting Switches 13a & 13b | Both ON | Either ON | Both ON with time lag t2 at most |
| Output of OR gate 20 | High | High | High → Low (within time lag t2) |
| Output of Timing Circuit C | High for t1 | High for t3 after t2 | High For t3 after t2 from when whichever first 13a & 13b is closed |
| Output of AND gate 17 Output of AND gate 18 | High for t1 | Only One Is High for t3 after t2 | Low |

It is to be noted here that the value of time t2 must be longer than a maximum possible range of different changeover timings of the switches 12 to 14 as an equal pressure on each of the buttons 12 to 14 gradually increases at the same speed from button to button. To increase the delay time t2 to a desired value, it is only necessary to increase the number of pairs of a mono-stable multivibrator and an inverter.

Next, explanation is given for the illumination drive circuit D for the external display liquid crystal panel 10 cooperating with the input control circuit B.

This illumination drive circuit D comprises an AND gate 30 for producing an output signal of "high" level when both of the outputs of the OR gates 20 and 21 are "high", that is, the input lock switch 15 is OFF and at least one of the setting switches 13a and 13b is OFF and at least one is ON, a frequency divider 31 receptive of the clock pulses from the data imprinting portion A, for producing a train of pulses of proper frequency with a duty cycle of 50%, an inverter 32 for producing an inverted signal to the signal produced by ON/OFF of the input lock switch 15, a lamp 38, NPN transistors 33, 34 and 35 for driving the lamp 36, an electrical power source or battery 37; and current limiting resistors 41, 42 and 43.

The operation of this illumination drive circuit D is as follows: (1) When the input lock switch 15 is OFF (the input is not locked), the output of the inverter 32 is "low" so that the NPN transistor 34 is always OFF. Since the output of the OR gate 20 is, on the other hand, "high", when the input switches 13a and 13b are both simultaneously closed, the output of the AND gate 30 becomes "high", thereby the NPN transistor 33 is turned on. Therefore, the lamp 36 is supplied with direct current, giving off light of high intensity.

(2) With the input lock switch 15 turned on (the input locked), because the output of the inverter 32 is "high", the NPN transistor 34 is turned on and off repeatedly when the NPN transistor 35 turns off and on respectively, thereby the lamp 36 is energized with the duty cycle of 50%. Therefore, its light is of low intensity. When either one of the input switches 13a and 13b is then closed, the output of the NAND gate 19 changes to "high", and the output of the OR gate 20 changes to "high". Therefore, the output of the AND gate 30 changes to "high", thereby the lamp 36 is supplied with direct current by the NPN transistor 33, changing its intensity to "high". Conversely when both of the input switches 13a and 13b are closed, the output of the NAND gate 19 remains "low", cutting off the supply of the direct current to the lamp 36, while the alternating current of duty cycle of 50% continues to be supplied to the lamp 36. It should be noted that when the camera is used under water at a deep depth, the input switches 13a and 13b are both turned on by the water button 15 when in underwater photography works input lock button 15 when in underwater photography works as a water pressure sensitive switch. The above-described functions are summarized in Table 2 below.

TABLE 2

| | Input Lock Switch 15 | Data Input | | Display Illumination (Lamp 36) | |
|---|---|---|---|---|---|
| | | Single | Double | No Data Input | When Inputting Data |
| In the Air | OFF | o (No Time Lag) | o (No Time Lag) | No Light | Bright |
| Under Water (Shallow) | ON (By Water | o (Time Lag Exists) | | Dim | Bright |

TABLE 2-continued

| | Input Lock | Data Input | | Display Illumination (Lamp 36) | |
|---|---|---|---|---|---|
| | Switch 15 | Single | Double | No Data Input | When Inputting Data |
| Under Water (Deep) | Pressure) | | | Dim | Dim |

As the user has set the data imprinting device, when to ascertain whether or not the setting has been effectively performed, he needs only to feel the mobility of the buttons 13a and 13b and to look at the display lamp 36 giving off light of high intensity. Also, whether or not the water pressure has been sensed is possible to make known by the display lamp 36 giving off light of low intensity, and it is thereby easy to ascertain what data are set in. Also, with the water pressure above the first threshold level, even in the case where the data input is possible, when performing the input setting operation, the user has to keep the button 13a or 13b pushed down for a longer time than when the water pressure is lower than that level. The necessity of paying due attention to the inputting operating leads to avoidance of errors.

Each of the input button switches 12, 13a, 13b and 14 and the input lock button switch 15 may be constructed with a flexible cover of watertight structure and a movable contact member such as a leaf spring or coil spring. It may be otherwise constructed in the form of a momentary switch comprising an electrically conductive rubber patch on the inside surface of the cover member cooperating with a switch pattern on a circuit substrate.

As the data imprinting portion A, use may be made of a wide variety of those known in the art. Also, instead of using the incandescent lamp 36, it is also possible to use an LED.

According to the present invention, the user can ascertain at a glance whether or not the data input is correct, and, at the same time, can know what data have been imprinted. The data imprinting device of the invention is, therefore, most suited for cameras which are usable even under water.

Figure 5:
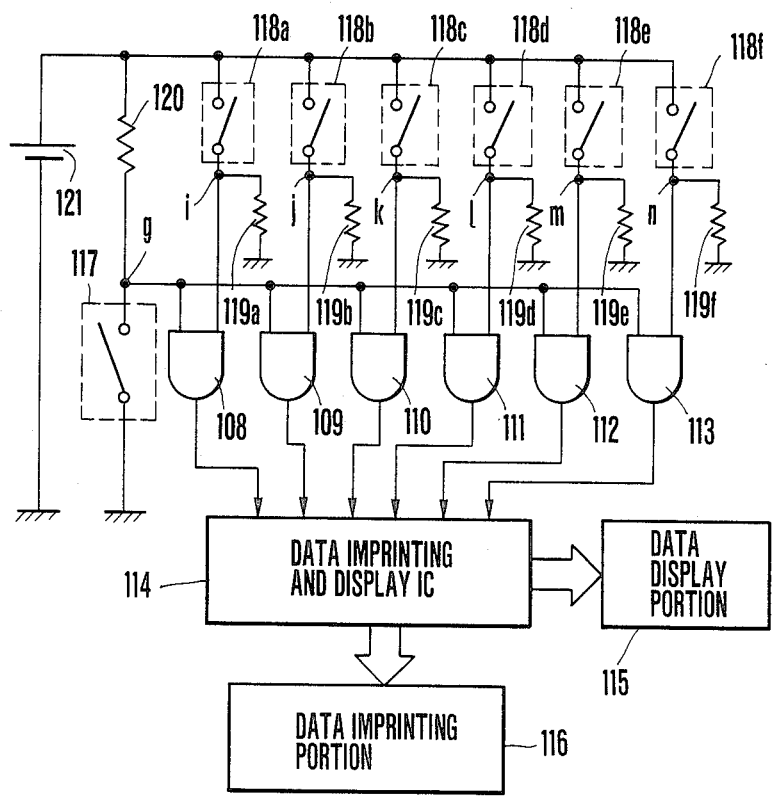
FIG. 5 is an electrical circuit diagram of the device of FIG. 3.
Figure 4:
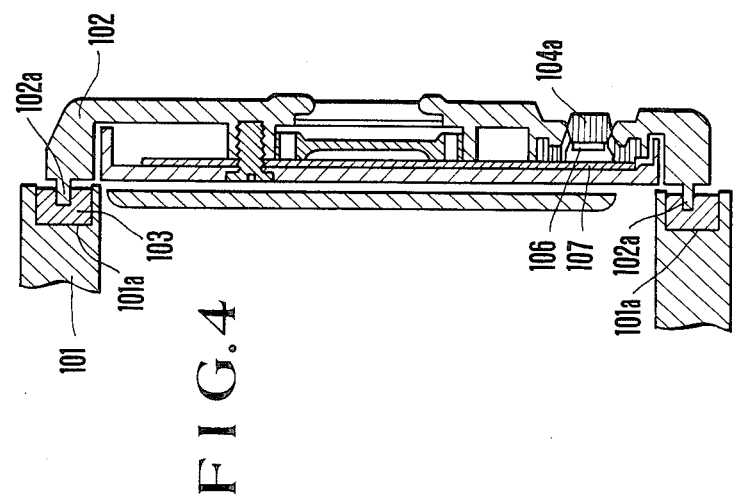
FIG. 4 is a sectional view of the back cover of FIG. 3.
Figure 3:
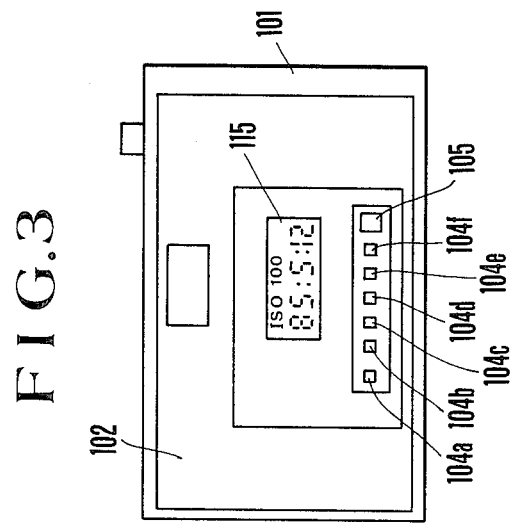
FIG. 3 is a plan view looking from the back cover of a camera of another embodiment of the data imprinting device according to the present invention.

Another embodiment of the invention is next described with reference to FIGS. 3 to 5. In FIGS. 3 to 5, 101 is a body cover; 102 is a back cover; 103 is a watertight packing fixedly mounted in a groove 101a of the body cover 101. When the back cover 102 is closed, a rib 102a enters the packing 103, thereby a watertight structure is established. 104a, 104b, 104c, 104d, 104e and 104f are buttons for selecting or correcting data such as year, month, day, hour and minute, and a changeover button for changing over the film speed or the like. 105 is a mode lock button. Each of these buttons is formed by an elastic material such as silicon rubber and is watertightly assembled with the back cover 102. On the back side of each of the changeover buttons 104a to 104f and the mode lock button 105, there is an electrically conductive member 106. When each button is pushed down, or deformed by the water pressure, the conductive member 106 short-circuits across electrically conductive patterns on a substrate 107 to produce an output signal which is applied to an integrated circuit 114 for data imprinting and display of known construction. The mode lock button 105 has such a form (for example, thin form) or substance as to deform by a smaller force than that for the changeover buttons 104a to 104f. Thereby, under water, the mode lock button 105 is turned on by the water pressure earlier than the changeover buttons 104a to 104f so that the data inputs by the changeover buttons 104a to 104f are hindered.

108, 109, 110, 111, 112 and 113 are AND gates; 115 and 116 are, respectively, a data display portion and a data imprinting portion, each of which is known in the art. 117 is a switch formed by the mode lock button 105, the electrically conductive member 106 and the circuit of the substrate 107. 118a, 118b, 118c, 118d, 118e and 118f are switches formed, respectively, by the changeover buttons 104a, 104b, 104c, 104d, 104e and 104f, the electrically conductive members 106 and the circuit of the substrate 107. When the switch 117 is OFF and when the switches 118a to 118f are selectively turned on, the corresponding one or ones of the AND gates 108 to 113 produces or produce a pulse signal or signals. Responsive to this signal or these signals, the data imprinting and display IC 114 performs data selection or correction, sending signals to the data display portion 115 and the data imprinting portion 116. 119a, 119b, 119c, 119d, 119e, 119f and 120 are pull-up resisters; 21 is a battery.

The operation is as follows: Now assuming that the camera is put into water, then the mode lock button 105 is first deformed by the water pressure, so that the switch 117 becomes conducting and the potential at a point g changes from "high" to "low". As the water pressure further increases, any one of the changeover buttons 104a to 104f is deformed to render the corresponding one of the switches 118a to 118f conducting so that the corresponding one of the points, i, j, k, l, m and n changes its potential from "low" to "high". However, because the potential at the point g is "low", none of the AND gates 108 to 113 produce an output signal which is applied to the data imprinting and display IC 114. Next when the data are selected or corrected on land, because the mode lock button 105 recovers its shape by its elasticity, the potential at the point g is "high". Therefore, when a desired one of the changeover buttons 104a to 104f is pushed down, the corresponding one of the switches 118a to 118f is rendered conductive, and the corresponding one of the points, i to n, changes its potential to "high". Responsive to this, the AND gates 108 to 113 produce signals which are applied to the data imprinting and display IC 114; thereby a necessary data selection or correction is carried out. According to the present invention, there is provided at least one mode lock push button switch responsive to application of a smaller pressure than that for the data input push buttons for making ineffective the data input by the data input push buttons, thereby it being made possible to provide for an underwater camera with the data imprinting device using the momentary switch.

What is claimed is:

1. A data imprinting device for a camera comprising:
    (a) data imprinting means;
    (b) data inputting means for inputting data to said data imprinting means, said date inputting means being arranged to input said data by a pressing force, from outside, of a first range;
    (c) prohibition means for outputting a signal to prohibit the inputting of said data from said data inputting means, said prohibiting means being arranged to output the prohibition signal by a pressing force, exerted from outside, not weaker than a pressing force of a second range, but weaker than the pressing force of said first range; and (d) altering means for altering a time required by said data inputting means for inputting said data, to a longer time in response to said prohibition signal of said prohibition means.

2. A data imprinting device for a camera comprising:
(a) data imprinting means;
(b) data inputting means for inputting data to said data imprinting means, said data inputting means being arranged to input said data by a pressing force, from outside, of a first range;
(c) prohibition means for outputting a signal to prohibit the inputting of said data from said data inputting means, said prohibiting means being arranged to output the prohibition signal by a pressing force, exerted from outside, not weaker than a pressing force of a second range, but weaker than the pressing force of said first range;
(d) altering means for altering a time required by said data inputting means for data inputting to a longer time in response to said prohibition signal of said prohibition means; and
(e) information means for informing of the operation state of said altering means.

3. An information input device usable in water comprising:
(a) operation means for inputting information, said operation means being operative to input the information by an external pressing force larger than a pressing force of a first range;
(b) prohibition means for outputting a prohibition signal for prohibiting the input of the information by the operation means, said prohibition means being arranged to output the prohibition signal by an external pressing force larger than a pressing force of a second range but weaker than the pressing force of said first range; and
(c) altering means for altering a time required by said operation portions for inputting the information to a longer time in response to the prohibition signal of said prohibition means.

4. An information input device usable in water comprising:
(a) operation means for inputting information, said operation means being operative to input the information by an external pressing force larger than a pressing force of a first range;
(b) prohibition means for outputting a prohibition signal for prohibiting the input of the information by the operation means, said prohibition means being arranged to output the prohibition signal by an external pressing force larger than a pressing force of a second range but weaker than the pressing force of said first range;
(c) means for altering a time required by said operation means to input the information to a longer time in response to the prohibition signal of said prohibition means; and
(d) means for informing of the operation state of said altering means.

5. A data imprinting device for a camera comprising:
(a) data imprinting means;
(b) data inputting means for inputting data to said data imprinting means, said inputting means having a plurality of data inputting operation parts;
(c) prohibition allowing means for allowing a prohibition of the function of said data inputting means; and
(d) discriminating means for prohibiting the function of said data inputting means in response to an actuation of said prohibition allowing means and to a state that all of said data inputting operation parts are operated, said discriminating means not prohibiting the function of said data inputting means when all of said data inputting operation parts are not operated even if said prohibition allowing means is in an actuated state, or when said prohibition allowing means is not in an actuated state even if all of said data inputting operation parts are operated.

6. A device according to claim 5, wherein said prohibition allowing means includes under water detecting means for detecting a state of under water and becoming actuated thereby.

7. A device according to claim 5, wherein said prohibition allowing means includes pressing pressure detecting means for detecting a pressing pressure and becoming actuated thereby.

8. A device according to claim 5, wherein said prohibition allowing means includes external force detecting means which is placed in an actuated state by a force weaker than a force of said data inputting operation means.

9. A device according to claim 5, further comprising timer means for responding to an actuation of said prohibition allowing means and allowing said data inputting means to function after an elapse of a predetermined period of time from a moment said data inputting operation means starts operation.

10. A device according to claim 5, further comprising informing means which can discriminate three different states, that is a state that said prohibition allowing means is not in a functioning condition, a state that said prohibition allowing means is in a functioning condition and said data inputting means is not functioning, and a state that said prohibition allowing means is in a functioning condition and said date inputting means is functioning.

11. An information setting device comprising:
(a) information setting means for setting information, said information setting means having a plurality of information inputting operation parts for inputting information;
(b) prohibition allowing means for allowing a prohibition of the function of said information setting means; and
(c) discriminating means for prohibiting the function of said information setting means in response to an actuation of said prohibition allowing means and to a state that all of said information inputting operation parts are operated, said discriminating means not prohibiting the function of said information setting means when all of said information inputting operation parts are not operated even if said prohibition allowing means is in an actuated state, or when said prohibition allowing means is not in an actuated state even if said information inputting operation parts are operated.

12. A device according to claim 11, wherein said prohibition allowing means includes under water detecting means for detecting a state of under water and becoming actuated thereby.

13. A device according to claim 11, wherein said prohibition allowing means includes pressing pressures detecting means for detecting a pressing pressure and becoming actuated thereby.

14. A device according to claim 11, wherein said prohibition allowing means includes under water detecting means for detecting a state of under water and becoming actuated thereby.

15. A device according to claim 11, further comprising timer means for responding to an actuation of said prohibition allowing means and making said information setting means to function after an elapse of a predetermined period of time from a moment said information inputting operation parts start operating.

16. A device according to claim 11, further comprising informing means which can discriminate three different states, that is a state said prohibition allowing means is not in an actuated state, a state that said prohibition allowing means is in an actuated state but said information setting means is not functioning, and a state that said prohibition allowing means is in an actuated state and said information setting means is functioning.

17. A data imprinting device for a camera comprising:
(a) data imprinting means;
(b) data inputting means for inputting data to said data imprinting means, said inputting means having data inputting operation means for making a data inputting operation;
(c) detecting means for detecting a state of under water; and
(d) timer means for responding to a detection by said detecting means of a state of under water and making said data inputting means to function after an elapse of a predetermined period of time after said data inputting operation means starts operating.

18. A device according to claim 17, wherein said detecting means detects a state of under water before said data inputting operation means is erroneously operated by an influence of being placed under water.

19. A data imprinting device for a camera comprising:
(a) data imprinting means;
(b) data inputting means for inputting data to said data imprinting means, said inputting means having data inputting operation means for making a data inputting operation;
(c) pressure detecting means for detecting a pressure; and
(d) timer means for responding to a detection by said pressure detecting means a pressure higher than a predetermined level of pressure and making said data inputting means to function after an elapse of a predetermined period of time after said data inputting operation means starts functioning.

20. A device according to claim 19, wherein said data inputting operation means includes pressing operation means for operating the same by a pressing, said pressing operation means being able to be operated by a pressing force stronger than said predetermined level of pressure detected by said pressure detecting means.

21. An information setting device comprising:
(a) information setting means for setting information, said information setting means having information inputting operation means for inputting information;
(b) detecting means for detecting a state of under water; and
(c) timer means for responding to a detection by said detecting means of a state of under water and making said information setting means to function after an elapse of a predetermined period of time after said information inputting operation means starts functioning.

22. A device according to claim 21, wherein said detecting means is so made that it detects a state of under water before said information inputting operation means is erroneously operated by an influence of being under water.

23. An information setting device comprising:
(a) information setting means for setting information, said information setting means having information inputting operation means for inputting information;
(b) pressure detecting means for detecting a pressure; and
(c) timer means for responding to a detection by said pressure detecting means of a pressure being higher than a predetermined level of pressure and making said information setting means to function after an elapse of a predetermined period of time after said information inputting operation means starts functioning.

24. A device according to claim 23, wherein said information inputting operation means includes pressing operation means for operating the same by a pressing, said pressing operation means being operable by a pressing pressure stronger than said predetermined level of pressure detected by said pressure detecting means.

25. An information setting device comprising:
(a) information setting means for setting information, said information setting means having information inputting operation means for inputting information;
(b) detecting means for detecting a state of under water; and
(c) delay means for responding to a detection by said detecting means of a state of under water and delaying a length of time from a moment said information inputting operation means starts operating till said information setting means functions.

26. A device according to claim 25, wherein said detecting means is so made that it detects a state of under water before said information inputting operation means is erroneously operated by an influence of being under water.

27. An information setting device comprising:
(a) an information setting means for setting information, said information setting means having information inputting operation means for inputting information;
(b) detecting means for detecting a state of under water; and
(c) delay means for responding to a detection by said pressure detecting means of a pressure being higher than a predetermined level of pressure and delaying a length of time from a moment said information inputting operation means starts operating till a moment said information setting means functions.

28. A device according to claim 27, wherein said information inputting operation means includes pressing operation means for operating the same by a pressing, said pressing operation means being operable by a pressing pressure stronger than said predetermined level of pressure detected by said pressure detecting means.

29. A data imprinting device for a camera comprising:
 (a) date imprinting means;
 (b) data inputting means for inputting data to said data imprinting means, said inputting means having data inputting operation means for making a data inputting operation;
 (c) detecting means for detecting a state of under water; and
 (d) delay means for responding to a detection by said detecting means of a state of under water and delaying a length of time from a moment said data inputting operation means starts operating till a moment said data inputting means functions.

30. A device according to claim 29, wherein said detecting means detects a state of under water before said data inputting operation means is erroneously operated by an influence of being placed under water.

31. A data imprinting device for a camera, comprising:
 (a) data imprinting means;
 (b) data inputting means for inputting data to said data imprinting means, said inputting means having data inputting operation means for making a data inputting operation;
 (c) pressure detecting means for detecting a pressure; and
 (d) delay means for responding to a detection by said pressure detecting means of a pressure being higher than a predetermined level of pressure and delaying a length of time from a moment said data inputting operation means starts operating till said data inputting means functions.

32. A device according to claim 31, wherein said data inputting operation means includes pressing operation means for operating the same by a pressing, said pressing operation means being able to be operated by a pressing force stronger than said predetermined level of pressure detected by said pressure detecting means.

* * * * *